United States Patent [19]

Horner

[11] Patent Number: 5,724,806
[45] Date of Patent: Mar. 10, 1998

[54] EXTRACTED, COOLED, COMPRESSED/INTERCOOLED, COOLING/COMBUSTION AIR FOR A GAS TURBINE ENGINE

[75] Inventor: Michael W. Horner, West Chester, Ohio

[73] Assignee: General Electric Company, Cincinnati, Ohio

[21] Appl. No.: 526,393

[22] Filed: Sep. 11, 1995

[51] Int. Cl.[6] ..................... F02C 7/14
[52] U.S. Cl. ............ 60/39.07; 60/39.75; 60/728
[58] Field of Search ............. 60/39.04, 39.07, 60/39.161, 39.75, 39.83, 266, 728, 736

[56] References Cited

U.S. PATENT DOCUMENTS

| | | | |
|---|---|---|---|
| 2,940,257 | 6/1960 | Eckert et al. | 60/39.75 |
| 4,514,976 | 5/1985 | Christoff | 60/39.07 |
| 4,751,814 | 6/1988 | Farrell | 60/39.183 |
| 4,991,394 | 2/1991 | Wright | 60/226.1 |
| 5,163,285 | 11/1992 | Mazeaud et al. | 60/39.07 |
| 5,185,997 | 2/1993 | Nishijima | 60/39.07 |
| 5,233,823 | 8/1993 | Day | 60/39.05 |
| 5,255,505 | 10/1993 | Cloyd et al. | 60/39.07 |
| 5,305,616 | 4/1994 | Coffinberry | 62/402 |
| 5,363,641 | 11/1994 | Dixon et al. | 60/39.02 |
| 5,363,642 | 11/1994 | Frutschi et al. | 60/39.04 |
| 5,392,595 | 2/1995 | Glickstein et al. | 60/39.02 |
| 5,392,614 | 2/1995 | Coffinberry | 62/402 |
| 5,414,992 | 5/1995 | Glickstein | 60/39.02 |
| 5,452,573 | 9/1995 | Glickstein et al. | 60/39.07 |

OTHER PUBLICATIONS

Ivan Rice, "Evaluation of the Compression–Intercooled Reheat–Gas–Turbine–Combined Cycle", Believed to be 1984, Asme Paper, pp. 1–8.

K. Takeya & H. Yasui, "Performance of the Inegrated Gas and Steam Cycle (IGSC) for Reheat Gas Turbines", Transactions of the Asme, vol. 110, Apr. 1988, pp. 220–232.

Primary Examiner—Louis J. Casaregola
Attorney, Agent, or Firm—Andrew C. Hess; Nathan D. Herkamp

[57] ABSTRACT

A system for cooling hot section components of a gas turbine engine. The cooling system includes a plurality of compressors, or compression train, and an intercooler disposed between each adjacent pair of compressors so as to achieve the desired pressure and temperature of the cooling air at reduced shaft power requirements. The first stage of compression may be provided by the booster, or low pressure compressor, of the engine, with the first intercooler receiving all of the air discharging from the booster. After exiting the first intercooler, a first portion of the booster discharge air is routed to the engine high pressure compressor and a second portion is routed to an inlet of the second compressor of the cooling air compression train. The compressed, cooled air exiting the last, downstream one of the compressors is used for cooling at least a first hot section component of the engine.

9 Claims, 4 Drawing Sheets

EXTRACTED, COOLED, COMPRESSED/ INTERCOOLED, COOLING/COMBUSTION AIR FOR A GAS TURBINE ENGINE

BACKGROUND OF THE INVENTION

1. Field of the Invention

The present invention relates generally to gas turbine engines, and more particularly, to a system for supplying extracted, cooled, compressed/intercooled, cooling and combustion air for gas turbine engines.

2. Related Art

The highest temperatures in gas turbine engines are typically found in the combustor and the turbines. The continuing demand for larger and more efficient gas turbine engines creates a requirement for increased turbine operating temperatures. However, as the combustor and turbine hot gas temperatures have been increased to achieve increased output and thermal efficiencies, the challenge to maintain component lives, due to the metallurgical limitations of critical hot components such as the turbine rotor blades and disks, as well as the challenge to control NOx emission levels has also increased.

Conventional air-cooled gas turbine engines typically extract cooling air from one or more stages of the high pressure compressor to provide cooling for elements of the combustor and high pressure turbine. Among the more recent of the known systems for providing cooling air to critical hot section components are those shown in U.S. Pat. Nos. 5,305,616 and 5,392,614, each issued to Coffinberry and assigned to the assignee of the present invention, each of which is expressly incorporated by reference herein in its entirety. Each of the various embodiments disclosed in the Coffinberry patents utilizes a first stream of cooling air extracted from the discharge of the high pressure compressor which is further compressed using a turbocompressor and cooled in a heat exchanger prior to cooling elements of the high pressure turbine and combustor. The turbine section of the turbocompressor is driven by air extracted from a mid-stage of the high pressure compressor. Other known systems utilizing a turbocompressor to further compress and cool extracted air from a high pressure compressor of a gas turbine engine have included a heat exchanger disposed between the compressor and turbine sections of the turbocompressor such that the inlet to the heat exchanger is in fluid flow communication with the outlet of the compressor section and the outlet of the heat exchanger is in fluid flow communication with the inlet of the turbine section. While such systems advantageously provide cooling air having a higher pressure and cooler temperature then would otherwise be available to hot section components, such systems are subject to the following disadvantages. Compressor discharge air is relatively expensive air, in terms of engine performance, and additionally is relatively difficult to further compress as compared to a lower pressure source of cooling air. Accordingly, gas turbine engine designers continue to search for new and improved cooling air systems, with issues including system pressure drop, compression power requirements, heat exchanger costs and reliability, and equipment size and weight, etc.

SUMMARY OF THE INVENTION

Accordingly, the present invention is directed to a system for cooling at least a first portion of a gas turbine engine having a compressor and a core gas stream. According to a preferred embodiment, the cooling system comprises a plurality of compressors disposed in serial flow relationship with one another and effective for compressing air. Each of the compressors has an inlet and an outlet, with an inlet of a first, upstream one of the compressors receiving air having a pressure which is less than or equal to a pressure of the core gas stream of the engine at an entrance to the high pressure compressor of the engine. The upstream compressor produces a first compressed airflow. The cooling system further comprises a first intercooler effective for reducing a temperature of the first compressed air flow. The first intercooler includes a first inlet and a first outlet for the first compressed airflow which receives cooling from the first intercooler. The first inlet is in fluid flow communication with the outlet of the upstream compressor and the first outlet of the first intercooler is in fluid flow communication with the inlet of a second one of the compressors. The first intercooler further includes a second inlet and a second outlet for a first coolant fluid providing cooling to the first intercooler. The airflow discharging from a last, downstream one of the compressors is used for cooling at least a first portion of the engine.

BRIEF DESCRIPTION OF THE DRAWINGS

The structural features and functions of the present invention will become more apparent from the following detailed description of the preferred embodiments when taken in conjunction with the accompanying drawings in which.

DETAILED DESCRIPTION

Figure 1:
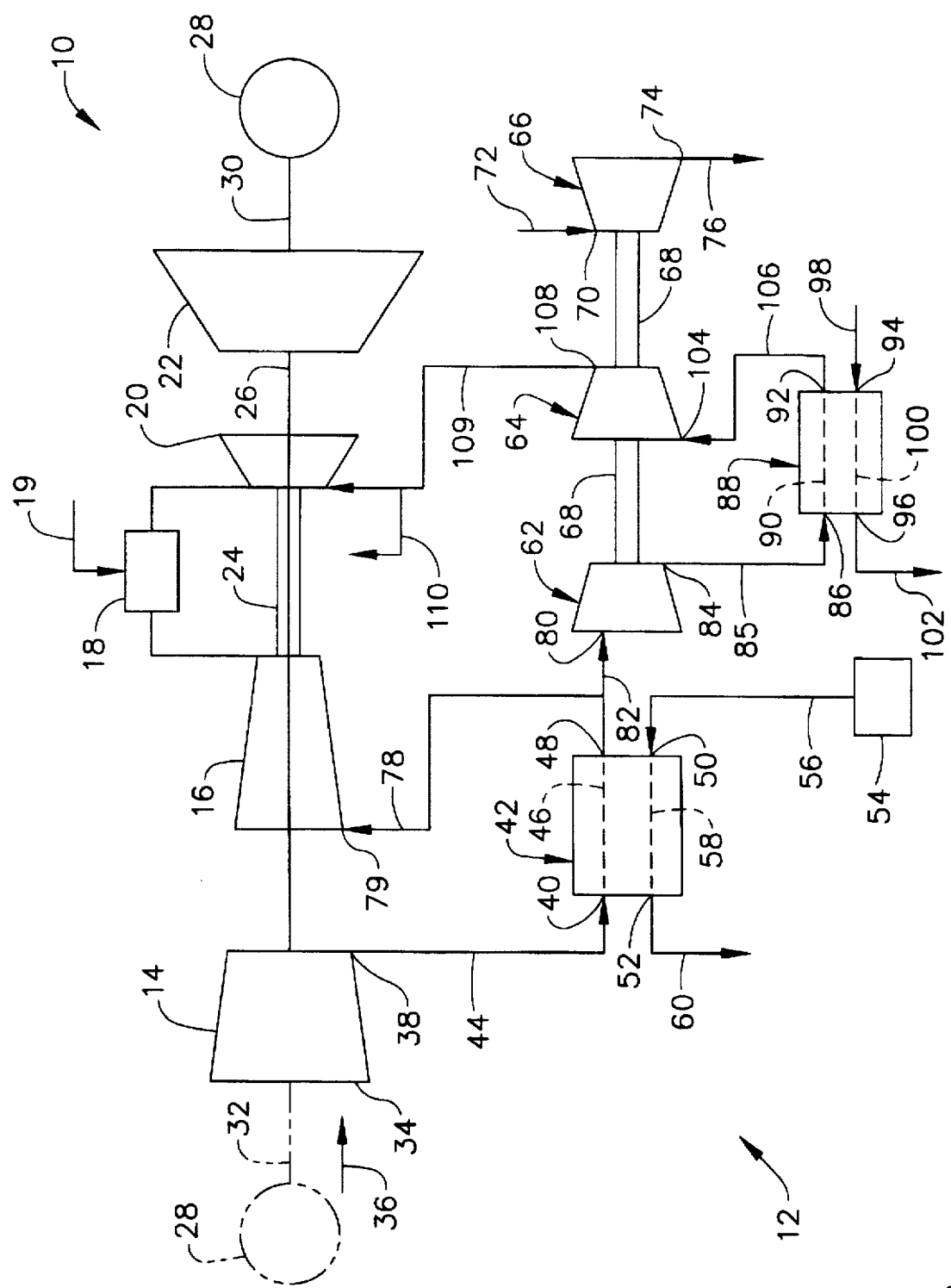
FIG. 1 is a block diagram of a gas turbine engine incorporating a cooling system according to the present invention.

Referring now to the drawings, FIG. 1 is a block diagram of a gas turbine engine 10 incorporating an engine cooling system indicated generally at 12, according to the present invention. The exemplary gas turbine 10 illustrated in FIG. 1 is derived from a turbofan engine of the type used to propel aircraft, and may be used in either marine or industrial applications. Engine 10 includes, in serial flow relationship, a booster or low pressure compressor 14, a high pressure compressor 16, a combustor 18, a high pressure turbine 20 and a low pressure turbine 22. The high pressure turbine 20 is drivingly connected to the high pressure compressor 16 with a first rotor shaft 24 and the low pressure turbine 22 is drivingly connected to the low pressure compressor 14 with a second rotor shaft 26 coaxially disposed within shaft 24 about a longitudinal centerline axis of engine 10. Engine 10 may be used to drive a load 28, which may comprise a marine propeller or an industrial gas generator for instance. Load 28 may be disposed afterward of engine 10 as shown in solid in FIG. 1, with load 28 drivingly coupled to an aft extension 30 of the rotor shaft 26, or alternatively, load 28 may be disposed forward of engine 10 as shown in phantom in FIG. 1 with load 28 coupled to a forward extension 32 of shaft 26. Engine 10 may be alternatively configured to include an intermediate turbine (not shown) disposed longitudinally or axially between high pressure turbine 20 and low pressure turbine 22. With this configuration, the intermediate turbine is drivingly connected to the low pressure compressor 14 via shaft 26 and low pressure turbine 22 comprises a power turbine which is disconnected from shaft 26, wherein the aft extension 30 of shaft 26 is replaced by a separate shaft connecting turbine 22 and load 28. It is noted that, unlike a turbofan engine, engine 10 does not include a fan disposed upstream of low pressure compressor or booster 14.

The low pressure compressor 14 includes an inlet 34 which receives ambient air 36 which is compressed by compressor 14, so as to increase the pressure and temperature of the ambient air. An outlet 38 of compressor 14 is in fluid flow communication with a first inlet 40 of an intercooler, or heat exchanger 42, with an entire portion of the compressed airflow discharging through outlet 38 of compressor 14 passing through a duct 44 to the first inlet 40 of intercooler 42. It is noted that although the term "intercooler" may be used in the art to denote a heat exchanger positioned flow-wise between two compressors, in the present context the term intercooler refers to a heat exchanger which is positioned between two components which may comprise two flow-wise adjacent compressors, or alternatively which may comprise a last, downstream compressor of one of the illustrated cooling systems of the present invention and a component of engine 10 such as high pressure turbine 20. Duct 40 may be relatively large in size so as to accommodate all of the compressed airflow discharging from compressor 14 and may be configured to comprise a scroll duct so as to accommodate the positioning of intercooler 42 mounted off of engine 10. Intercooler 42 is effective for reducing a temperature of the compressed airflow from duct 44 which flows through intercooler 42 along a flowpath 46 between inlet 40 and a first outlet 48 of intercooler 42. Intercooler 42 may comprise a conventional counterflow heat exchanger and includes a second inlet 50 and a second outlet 52 for a coolant fluid providing cooling to intercooler 42 so as to reduce the temperature of the compressed airflow from duct 44. In the embodiment illustrated in FIG. 1, the coolant fluid as illustrated as comprising ambient air which may be forced by a conventional blower 54 through a duct 56 to the second inlet 50 of intercooler 49. The ambient air then flows through intercooler 42 along path 58 discharging through outlet 52 to ambient via a duct 60. The temperature of the ambient air is less than a temperature of the compressed airflow entering intercooler 42 from duct 44 and therefore results in a reduction of the temperature of the compressed airflow from the low pressure compressor 14. Alternatively, the coolant fluid provided to intercooler 42 may comprise water or fuel, with conventional means such as pumps used to provide the fluid to the second inlet 50 of intercooler 42. If fuel is used, the fuel discharging through the second outlet 52 may be routed to combustor 18, with the heat added to the fuel as it passes through intercooler 42 being added to engine 10. As a further alternative, a fuel/water heat exchanger (not shown) may be used in conjunction with intercooler 42. In this instance, water is provided to the second inlet 50 of intercooler 42 and flows through intercooler 42 providing cooling to the compressed airflow from duct 44. After discharging from the second outlet 52 of intercooler 42 the water is ducted to the fuel/water heat exchanger where it receives cooling. The water is then returned to the second inlet 50 of intercooler 42, providing a closed loop system. Cooling is provided to the fuel/water heat exchanger by the fuel, which may be routed to combustor 18 after exiting the fuel/water heat exchanger. By providing such an arrangement, the cooling capacity of available fuel may be utilized while avoiding any risk of hot air contacting fuel within intercooler 42.

The cooling system 12 further includes second and third compressors comprising, respectively, a first auxiliary compressor 62 and a second auxiliary compressor 64. Each of the auxiliary compressors 62 and 64 is driven by a power source 66. In the illustrative embodiment shown in FIG. 1, power source 66 comprises an auxiliary turbine which is coupled to each of the auxiliary compressors 62 and 64 via a shaft 68. Turbine 66 includes an inlet 70 which is in fluid flow communication with high pressure compressor 16, preferably a mid-stage of compressor 16, via a duct 72. The air from high pressure compressor 16 is used to drive turbine 66 and in the process is cooled as it expands through turbine 66 in a conventional manner. This air then discharges turbine 66 through an outlet 74 and may be routed to the low pressure turbine 22 through a duct 76 for purposes of cooling turbine 22. Alternatively, power source 66 may comprise an electric motor or other conventional means of providing motive power to auxiliary compressors 62 and 64. After discharging from the first outlet 48 of intercooler 42, the compressed airflow produced by low pressure compressor 14 is split into a first portion which is in fluid flow communication with an inlet 79 of the high pressure compressor 16 via duct 78 and a second portion which is in fluid flow communication with an inlet 80 of the first auxiliary compressor 62 via a duct 82. It should be understood that the mass flowrate of the second portion of air passing through the duct 82 is significantly less than the mass flowrate of air passing through duct 78 and entering inlet 79 of high pressure compressor 16. The air entering high pressure compressor 16 comprises the primary or core gas stream of engine 10 and is further compressed by compressor 16. The core gas stream of engine 10 then enters combustor 18 where the pressurized air is mixed with fuel, provided to combustor 18 via duct 19, and burned to provide a high energy gas stream, in a conventional manner. This high energy gas stream then enters, in succession, the high pressure turbine 20 and the low pressure turbine 22 where the gas stream is expanded and energy is extracted to operate the high pressure compressor 16 and the low pressure compressor 14, as well as to drive load 28.

The air entering auxiliary compressor 62 through inlet 80 is further compressed and discharges compressor 62 through an outlet 84 with a higher pressure and temperature than the compressed air stream discharging intercooler 42. Outlet 84 of compressor 62 is in fluid flow communication with a first inlet 86 of a second intercooler, or heat exchanger 88 via a duct 85. The compressed airflow entering inlet 86 flows through intercooler 88, so as to receive cooling from intercooler 88, along a flow path 90 and discharges intercooler 88 through a first outlet 92. Intercooler 88 further includes a second inlet 94 and a second outlet 96 for a coolant fluid providing cooling to intercooler 88. The coolant fluid may alternatively comprise air, water or fuel and is supplied to the second inlet 94 of intercooler 88 via duct 98 and then flows through intercooler 88 along flowpath 100 and discharges through the second outlet 96 of intercooler 88 into duct 102. If the coolant fluid comprises fuel, duct 102 may be routed to combustor 18 so as to utilize the heat added to the fuel as it passes through intercooler 88. As with intercooler 42, intercooler 88 may comprise a conventional counterflow heat exchanger. The first outlet 92 of intercooler 88 is in fluid flow communication with an inlet 104 of the second auxiliary compressor 64, via duct 106. The air entering compressor 64 through inlet 104 is further compressed and discharges compressor 64 through an outlet 108. The outlet 108 of auxiliary compressor 64 is in fluid flow communication with the high pressure turbine 20 via duct 109. The compressed air passing through duct 109 to high pressure turbine 20 may be used for cooling various components of the high pressure turbine 20 such as the stage 1 nozzles (not shown). A portion of the air discharging compressor 64 may optionally be directed to combustor 18 through duct 110, for purposes of cooling elements of combustor 18 such as a liner (not shown) of combustor 18. Any air used to cool the liner of combustor 18 may then be injected at a premixer (not shown) of combustor 18 to lean a combustor dome (not shown) fuel/air mixture. Although the cooled, compressed air discharging from compressor 64 may be provided to the high pressure turbine 20 and combustor 18 via separate ducts in a parallel flow configuration, as shown in FIG. 1, the cooled, compressed air may be provided to high pressure turbine 20 and combustor 18 in a series flow configuration (not shown). In such a configuration, the compressed air may be routed to high pressure turbine 20 via a duct such as duct 109 and may then be routed to elements of combustor 18, such as the liner of combustor 18, after flowing through elements of turbine 20, such as the stage 1 nozzles of turbine 20. For a more detailed discussion of the manner in which cooling air may flow first through the stage 1 high pressure turbine nozzles and then through the combustor liner, the reader may refer to copending and commonly assigned U.S. Patent Application entitled "Regenerative Combustor Cooling In a Gas Turbine Engine" (Attorney Docket No. 13DV-11660).

In operation, ambient air is received and compressed by the low pressure compressor 14, which comprises an upstream compressor of cooling system 12, and the compressed airflow is then routed through intercooler 42 where the temperature of the compressed air is reduced. A first, larger portion of the air discharging through the outlet 48 of intercooler 42 is routed to the inlet 79 of the high pressure compressor 16 through duct 78, so as to provide the core gas stream of engine 10. A second, smaller portion of the air discharging intercooler 42 is compressed in succession by auxiliary compressors 62 and 64 and further cooled by intercooler 88 after discharging from compressor 62 and prior to entering compressor 64. Compressor 64 comprises a last, or downstream compressor of cooling system 12. The air discharging auxiliary compressor 64 is then routed to the high pressure turbine 20, via duct 109, where it is used for cooling components of the high pressure turbine 20 such as the stage 1 nozzles. A portion of the air discharging auxiliary compressor 64 may also be routed to combustor 18, via duct 110, where it may be used for cooling elements of the combustor 18 such as the combustor liner. Alternatively, the cooling air may flow first through the stage 1 nozzles of high pressure turbine 20 and then through the liner of combustor 18, in a series flow arrangement, as discussed previously. The use of the three stages of compression provided by low pressure compressor 14, and auxiliary compressors 62 and 64, as well as the cooling provided by intercoolers 42 and 88 provides cooling air for use to the high pressure turbine 20 of engine 10 which is of a higher pressure and lower temperature then would otherwise be available. The specific magnitude of the pressure and temperature of the cooling air provided to the high pressure turbine is dependent upon the particular application and the sizing of each compressor and intercooler. However, the magnitude of the incremental pressure and temperature, relative to that of conventional cooling, may be similar to that stated in the illustrative examples provided in U.S. Pat. Nos. 5,392,614 and 5,305,616. The use of cooling system 12 is particularly advantageous when applied to an engine incorporating series flow of cooling air through the high pressure turbine stage 1 nozzles and combustor liner, as discussed in detail in the copending and commonly assigned U.S. Patent Application having Attorney Docket 13DV-11660. This is the case since the increased pressure of the cooling air of system 12, relative to that of prior conventional cooling systems, permits such a series flow arrangement while maintaining sufficient cooling air pressure so that the cooling air may then be injected at the premixer of combustor 18 so as to lean the combustor dome fuel/air mixture which results in a reduction of the adiabatic flame temperature and attendant Zeldovich NOx emissions.

Figure 2:
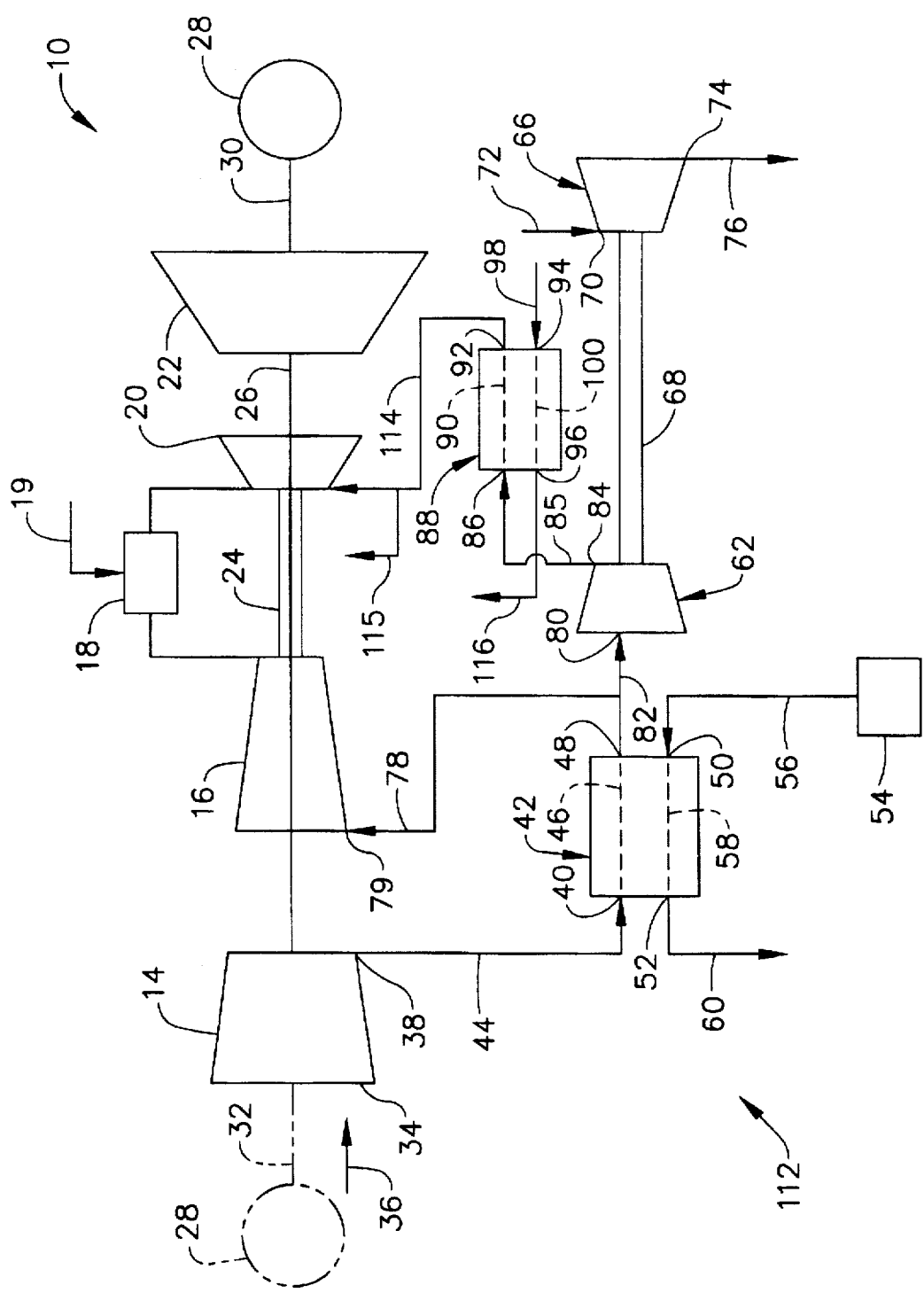
FIG. 2 is a block diagram of the gas turbine engine shown in FIG. 1 and the cooling system of the present invention according to an alternative embodiment.

Referring now to FIG. 2, an alternative cooling system 112 according to the present invention is illustrated. Cooling system 112 is identical to cooling system 12 with the following exceptions. The second auxiliary compressor 64 shown in the embodiment of cooling system 12 is not utilized in cooling system 112, with only two stages of compression provided by the low pressure compressor 14 and the first auxiliary compressor 62, which comprises the last, downstream compressor of cooling system 112, for the air which is routed to high pressure turbine 20 and combustor 18 for cooling. In the present context a "stage of compression" is intended to refer to the compression provided by any of the various compressors included in the disclosed cooling systems, such as low pressure compressor 14 and auxiliary compressors 62 and 64. However, it should be understood that at least low pressure compressor 14 may comprise a "multi-stage", axial flow compressor as is typically used in engine 10, with "multi-stage" referring to a plurality of alternating rows of stationary vanes and rotating blades mounted on disks. Additionally, while low pressure compressor 14 and auxiliary compressors 62 and 64 may comprise axial flow compressors, each of the compressors 14, 62 and 64 may comprise a radial flow compressor. Another difference between cooling systems 12 and 112 is that the second intercooler 88 may be deleted in cooling system 112, with the outlet 84 of the first auxiliary compressor 62 being in direct fluid flow communication with at least the high pressure turbine 20 via a duct (not shown). Alternatively, intercooler 88 may be disposed between auxiliary compressor 62 and high pressure turbine 20, with the outlet 84 of compressor 62 in fluid flow communication with the first inlet 86 of intercooler 88 via duct 85, in the same manner as shown in FIG. 1 for cooling system 12. The only difference with respect to intercooler 88 in cooling system 112 is that the first outlet 92 of intercooler 88, which is used to discharge the compressed airflow from auxiliary compressor 62, is direct fluid flow communication with the high pressure turbine 20, via a duct 114 as shown in FIG. 2, rather than with the second auxiliary compressor 64 which is not used. A portion of the air discharging intercooler 88 may optionally be supplied to combustor 18 via duct 115. Although the coolant fluid provided to the second inlet 94 of intercooler 88 may alternatively comprise air, water or fuel, fuel is the preferable source of coolant fluid with the fuel discharging from the second outlet 96 of intercooler 88 in fluid flow communication with combustor 18 via a duct 116 as shown in FIG. 2. The operation of cooling system 112 is the same as that described previously with respect to cooling system 12 with the exception that fewer stages of compression, and possibly fewer stages of intercooling, are provided for the compressed airflow ultimately routed to the high pressure turbine 20 and optionally to combustor 18 for purposes of cooling. Consequently, the air provided to the high pressure turbine 20 and combustor 18 may be of a lower temperature than that provided previously with respect to cooling system 12. Although three stages of compression have been illustrated with respect to cooling system 12 and two stages of compression has been illustrated with respect to cooling system 112, regarding the compressed airflow provided for cooling to high pressure turbine 20 and combustor 18, it should be understood that additional stages of compression and intercooling may be used for the cooling airflow provided to engine 10. The particular compression train configuration is selected, based upon tradeoff studies, which provides the highest compression efficiency with the least equipment and the associated costs, consistent with the cooling air requirements for the particular application of engine 10. In some instances compression efficiency may not be maximized so as to maintain equipment costs within desirable limits. Although additional stages of compression may be utilized, the additional gain in compression efficiency may be marginal as explained in U.S. Pat. No. 4,751,814 to Farrell, which is assigned to the assignee of the present invention and is incorporated by reference herein in its entirety.

Figure 3:
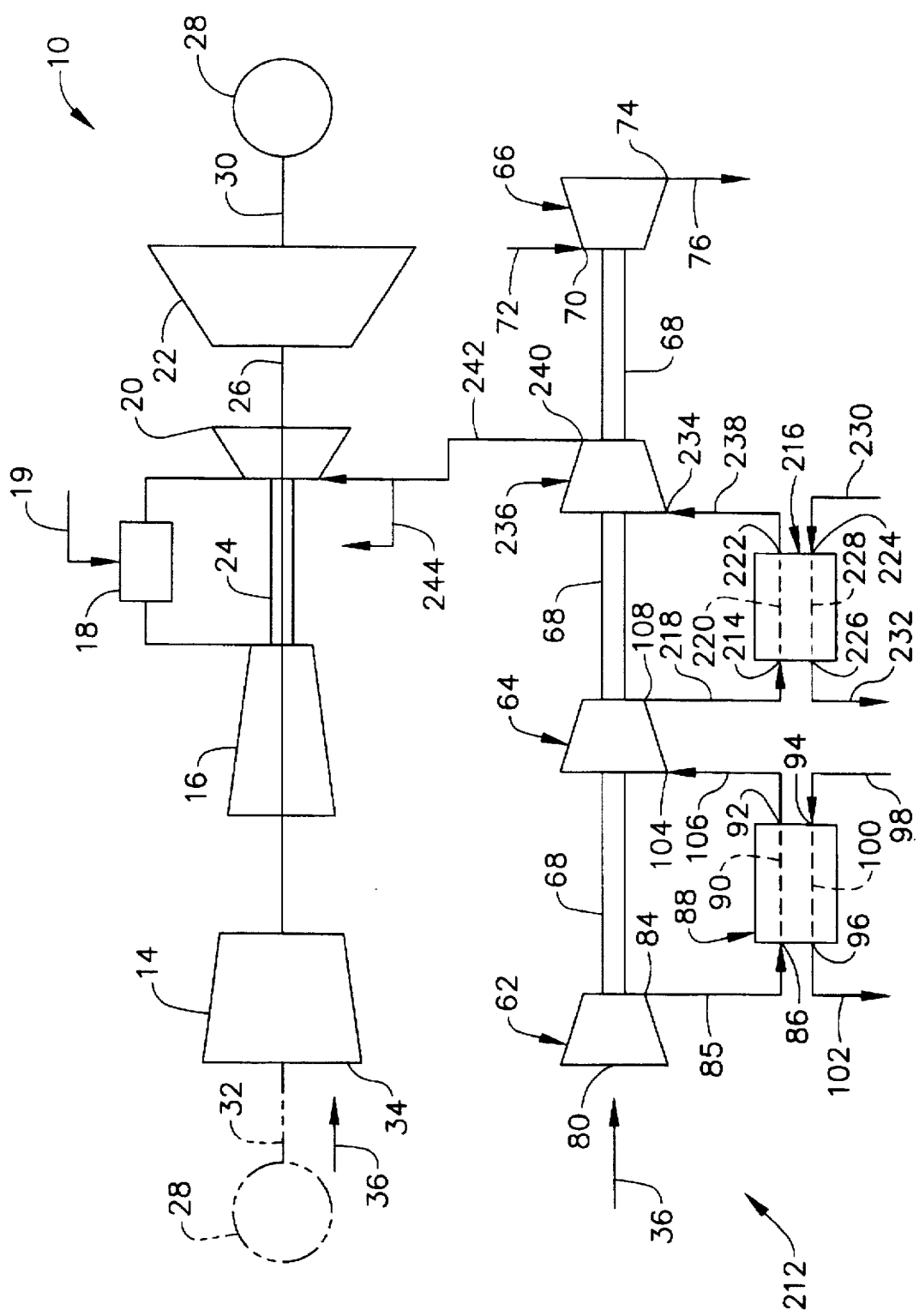
FIG. 3 is a block diagram of the gas turbine engine shown in FIG. 1 and the cooling system of the present invention according to another alternative embodiment.

Referring now to FIG. 3, a cooling system 212 is illustrated according to an alternative embodiment of the present invention. Cooling system 212 is the same as cooling system 12, with the following exceptions. Heat exchanger 42 of system 12 is omitted from cooling system 212 and accordingly, all of the air discharging from the low pressure compressor 14 is routed directly to the high pressure compressor 16, in a conventional manner. The auxiliary compressors 62 and 64 and intercooler 88 are configured, and function as described previously with respect to cooling system 12 except that auxiliary compressor 62 now comprises the first, or upstream compressor in the compression train, or series of compressors of cooling system 212, and ambient air 36 is received by the inlet 80 of auxiliary compressor 62. Ambient air 36 also enters the inlet 34 of the low pressure compressor 14 of engine 10. Another difference between cooling systems 212 and 12, is that in cooling system 212 the outlet 108 of auxiliary compressor 64 is in fluid flow communication with an inlet 214 of a second intercooler 216, with the compressed airflow discharging from the second auxiliary compressor 64 flowing to intercooler 216 via a duct 218. The compressed airflow entering intercooler 216 travels along a path 220, thereby receiving cooling from intercooler 216, and discharges through a first outlet 222 of intercooler 216. Intercooler 216 further includes a second inlet 224 and a second outlet 226 for a coolant fluid flowing through intercooler 216 along path 228 so as to provide cooling to intercooler 216. The coolant fluid is supplied to inlet 224 via duct 230, and may comprise air, water or fuel. The coolant fluid discharges intercooler 216 through duct 232, which is in fluid flow communication with combustor 18 if the coolant fluid used is fuel. The first outlet 222 of intercooler 216 is in fluid flow communication with an inlet 234 of a third auxiliary compressor 236, which comprises a last, downstream compressor of cooling system 212. As with auxiliary compressors 62 and 64, auxiliary compressor 236 may comprise either an axial flow or a radial flow compressor. The compressed, cooled airflow discharging from intercooler 216 flows to inlet 234 of compressor 236 via a duct 238. The compressed, cooled air entering compressor 236 is then further compressed and then discharges compressor 236 through an outlet 240. Outlet 240 of compressor 236 is in fluid flow communication with at least the high pressure turbine 20, with the compressed airflow ducted to turbine 20 via a duct 242. The outlet 240 of compressor 236 may further be in fluid flow communication with the combustor 18 of engine 10, with a portion of the compressed airflow discharging from compressor 236 ducted to combustor 18 via a duct 244. Any cooling air ducted to combustor 18 may be utilized as described previously with respect to system 12. Each of the auxiliary compressors 62, 64 and 236 are driven by the power source 66, which may comprise an auxiliary turbine configured as shown in FIG. 3, or alternatively may comprise an electric motor or other conventional means of supplying motive power to the compressors 62, 64 and 236 via at least one shaft 68.

In operation, ambient air 36 is compressed, in succession, by auxiliary compressors 62, 64 and 236, with the compressed airflow being cooled by intercoolers 88 and 216 between adjacent stages of compression, so as to provide the desired pressure and temperature of the compressed cooling airflow provided to elements of high pressure turbine 20 and optionally to elements of combustor 18. As with cooling system 12, the compressed cooling airflow of cooling system 212 may be provided to elements of high pressure turbine 20 and combustor 18 in either a parallel flow or series flow configuration. Ambient air 36 also enters the inlet 34 of low pressure compressor 14 and is compressed in succession by compressors 14 and 16, and mixed with fuel and burned in combustor 18 so as to create a high energy gas stream which is then expanded through turbines 20 and 22.

Figure 4:
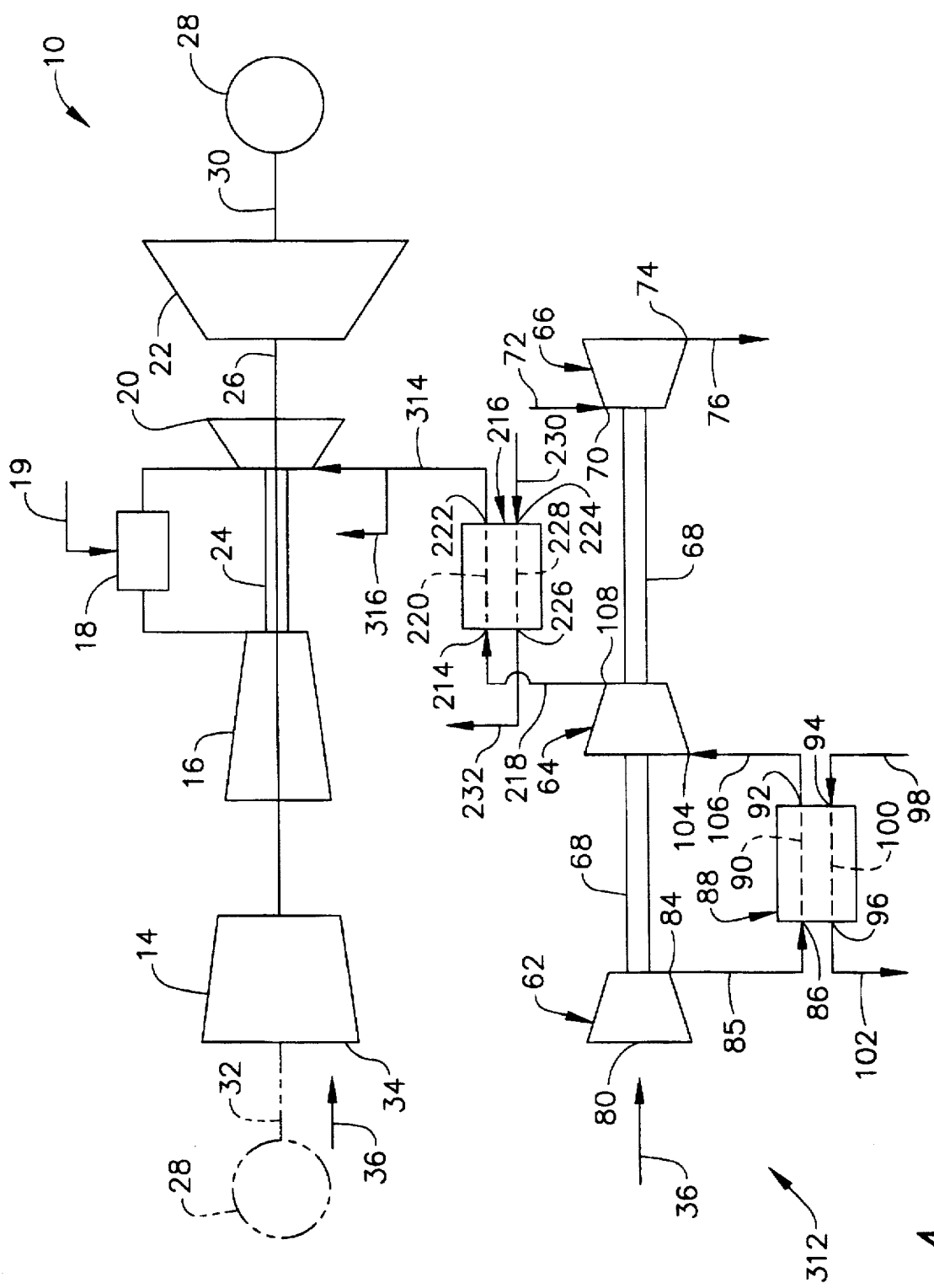
FIG. 4 is a block diagram of the gas turbine engine shown in FIG. 1 and the cooling system of the present invention according to another alternative embodiment.

Referring now to FIG. 4, a cooling system 312 according to an alternative embodiment of the present invention is illustrated. Cooling system 312 is the same as cooling system 212 with the following exceptions. Cooling system 312 does not include the third auxiliary compressor 236, but instead includes only upstream auxiliary compressor 62 and downstream auxiliary compressor 64, with ambient air 36 entering the inlet 80 of auxiliary compressor 62. Ambient air 36 also enters the inlet 34 of the low pressure compressor 14 of engine 10 and flows through engine 10 as discussed previously with respect to cooling system 212. Another difference between systems 312 and 912 is that in system 312 intercooler 916 is positioned flow-wise between the second, and last auxiliary compressor 64 and at least the high pressure turbine 20 of engine 10. The compressed airflow discharging compressor 64 through outlet 108 and duct 218 is provided to the first inlet 214 of intercooler 216, as with cooling system 212. Additionally, the coolant fluid is provided to the second inlet 224, as discussed previously with respect to cooling system 212. However, the first outlet 222 of intercooler 216 is now in direct fluid flow communication with at least the high pressure turbine 20, rather than being in fluid flow communication with the inlet 234 of the third auxiliary compressor 236 which is not used in cooling system 312. Outlet 222 of intercooler 216 may optionally also be in fluid flow communication with combustor 18. At least a portion of the compressed airflow discharging intercooler 216 through the first outlet 222 is ducted to the high pressure turbine 20 via a duct 314 and a second, optional portion may be ducted to the combustor 18 via duct 316. It is further noted that the use of intercooler 216 in cooling system 312 is optional, with the use of intercooler 216 dependent upon the particular application of cooling system 312. In certain applications, the outlet 108 of the second auxiliary compressor 64 may be in direct fluid flow communication with at least the high pressure turbine 20 and optionally, combustor 18. With the exception of the deletion of the third auxiliary compressor 236 and the optional use of intercooler 216, the operation of cooling system 312 is otherwise the same as that discussed previously with respect to cooling system 212.

In operation, any of the cooling systems of the present invention may be used to provide high pressure, cooled cooling air to a first portion of engine 10, such as the high pressure turbine 20, and additionally to a second portion of engine 10, such as combustor 18, so as to achieve increased cooling of elements of turbine 20 and combustor 18. Additionally, the various embodiments of the present invention may be used to provide cooling air at a pressure significantly higher than otherwise available thereby permitting a series flow of the cooling air through elements of turbine 20 and combustor 18. The increased cooling of elements of turbine 20 and combustor 18 may be accomplished while minimizing injection of cooling air ahead of the inlet of the rotor (not shown) of high pressure turbine 20 by injecting at least a portion of the cooling air at the premixer of combustor 18. This feature raises the inlet temperature of the rotor of high pressure turbine 20 at which dry low NOx emissions requirements can be achieved since the dome fuel/air mixture is reduced, thereby reducing the adiabatic flame temperature and attendant Zeldovich NOx emissions. The arrangement of the compressors and intercoolers of the various embodiments of the present invention reduces the shaft horsepower necessary to accomplish the overall compression of the cooling air to a given level above the discharge of the high pressure compressor 16, and provides cooling air at a temperature significantly lower than otherwise available with the cooling air of conventional systems utilizing simple extraction points in compressor 16 to provide cooling air. Additionally, if cooling systems 12 or 112 are utilized a further advantage is realized since the first level of compression is accomplished by the highly efficient low pressure compressor 14 of engine 10, thereby reducing the additional equipment required to further compress the cooling air. A further reduction in equipment may be realized when either of cooling systems 12 or 112 of the present invention is applied to an engine having an intercooled compressor cycle configuration such as engine 10 in FIGS. 1 and 2. In these instances the first stage of intercooling of systems 12 and 112 is also existing in the overall cycle arrangement of engine 10 and is provided by an intercooler such as intercooler 42.

While the foregoing description has set forth the preferred embodiments of the invention in particular detail, it must be understood that numerous modifications, substitutions and changes can be undertaken without departing from the true spirit and scope of the present invention as defined by the ensuing claims. For instance, although the cooling system of the present invention has been illustrated in various embodiments in conjunction with a gas turbine engine comprising a derivative of a turbofan engine, the cooling system of the present invention may further be used with a turbofan engine, or with an industrial gas turbine engine which is not derived from a turbofan engine and may therefore be made of a heavier construction than that normally associated with turbofan engines. Additionally, although the cooling air produced by the cooling system of the present invention has been illustrated for use with the high pressure turbine and combustor, it may further be utilized with other hot section components such as the low pressure turbine, an intermediate turbine or a power turbine, or with internal or external clearance control systems. The invention is therefore not limited to specific preferred embodiments as described, but is only limited as defined by the following claims.

What is claimed is:

1. A system for cooling at least a first portion of a gas turbine engine having a high pressure compressor and a core gas stream, said cooling system comprising:

a plurality of compressors disposed in serial flow relationship with one another and effective for compressing air, each of said compressors having an inlet and an outlet, wherein said inlet of a first, upstream one of said compressors receives air having a pressure which is less than or equal to a pressure of the core gas stream at an entrance to the high pressure compressor of the engine, said upstream compressor producing a first compressed airflow, said upstream compressor comprising a low pressure compressor of the engine, and a second compressor comprising a first auxiliary compressor producing a second compressed airflow;

a first intercooler effective for reducing a temperature of said first compressed airflow, said first intercooler having a first inlet and a first outlet for said first compressed airflow receiving cooling from said first intercooler, said first inlet in fluid flow communication with said outlet of said upstream compressor and said first outlet in fluid flow communication with said inlet of said second compressor, said first intercooler further including a second inlet and a second outlet for a first coolant fluid providing cooling to said first intercooler, said first compressed airflow received by said first inlet of said first intercooler comprising an entire portion of the airflow discharging through said outlet of said low pressure compressor of the engine, said first compressed airflow discharging from said first outlet of said first intercooler split into a first portion in fluid flow communication with the high pressure compressor of the engine and a second portion in fluid flow communication with said inlet of said first auxiliary compressor;

wherein an airflow discharging from a last, downstream one of said compressors is used for cooling said at least a first portion of the engine.

2. The cooling system as recited in claim 1, wherein:

said last, downstream compressor comprises a second auxiliary compressor;

said cooling system further includes a second intercooler having a first inlet and a first outlet for said second compressed airflow receiving cooling from said second intercooler, said first inlet of said second intercooler in fluid flow communication with said outlet of said first auxiliary compressor, said first outlet of said second intercooler in fluid flow communication with said inlet of said second auxiliary compressor;

said second intercooler further includes a second inlet and a second outlet for a second coolant fluid providing cooling to said second intercooler;

said outlet of said second auxiliary compressor is in fluid flow communication with said at least a first portion of the engine.

3. The cooling system as recited in claim 1, wherein: said first auxiliary compressor is said last, downstream compressor.

4. The cooling system as recited in claim 3, further comprising:

a second intercooler having a first inlet and a first outlet for said second compressed airflow receiving cooling from said second intercooler, said first inlet of said second intercooler in fluid flow communication with said outlet of said first auxiliary compressor, said first outlet of said second intercooler in fluid flow communication with said at least a first portion of the engine;

wherein said second intercooler further includes a second inlet and a second outlet for a second coolant fluid providing cooling to said second intercooler.

5. The cooling system as recited in claim 4, wherein:

said second coolant fluid comprises fuel;

said second inlet of said second intercooler is in fluid flow communication with a source of said fuel;

said second outlet of said second intercooler is in fluid flow communication with a combustor of the engine.

6. The cooling system as recited in claim 1, further comprising:

an auxiliary power source;

wherein said low pressure compressor is driven by a turbine of the engine and remaining ones of said plurality of compressors are driven by said auxiliary power source.

7. The cooling system as recited in claim 6, wherein:

said at least a first portion of the engine comprises a high pressure turbine of the engine;

said auxiliary power source comprises an auxiliary turbine, said auxiliary turbine having an inlet in fluid flow communication with the high pressure compressor of the engine and an outlet in fluid flow communication with a low pressure turbine of the engine for cooling the low pressure turbine;

said auxiliary turbine is coupled to said remaining ones of said plurality of compressors via at least one shaft.

8. The cooling system as recited in claim 6, wherein said auxiliary power source comprises an electric motor coupled to said remaining ones of said plurality of compressors via at least one shaft.

9. The cooling system as recited in claim 2, wherein:

said second coolant fluid is selected from the group consisting of air, water and fuel.

* * * * *